June 29, 1926.
A. F. SHORE
1,590,448
PHOTOGRAPHIC CAMERA AND LENS
Filed May 29, 1924
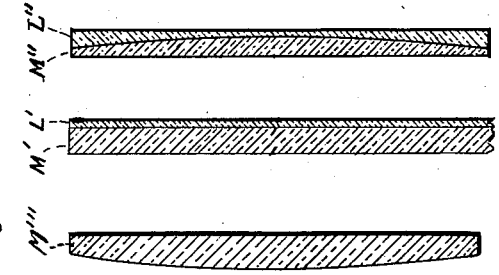
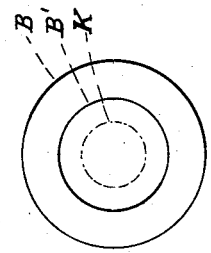
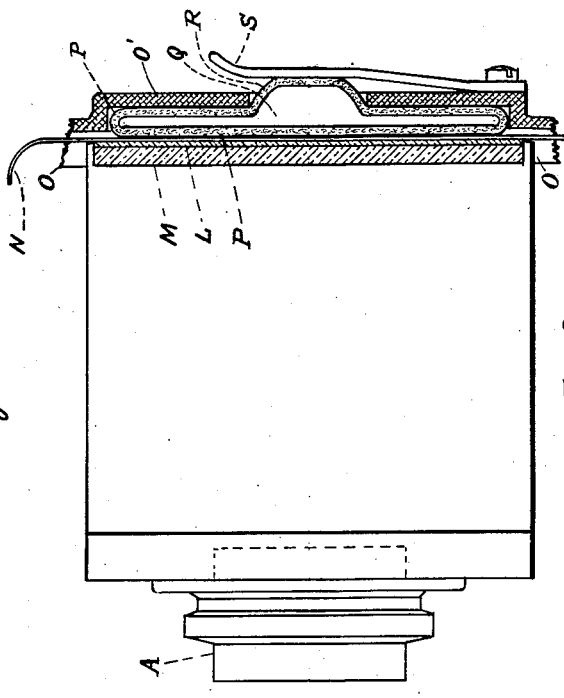
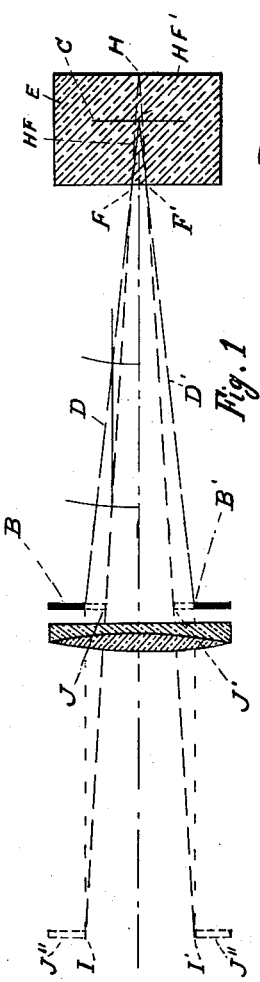
INVENTOR.
Albert F. Shore
BY
ATTORNEY Patented June 29, 1926.

1,590,448

UNITED STATES PATENT OFFICE.

ALBERT F. SHORE, OF NEW YORK, N. Y.

PHOTOGRAPHIC CAMERA AND LENS.

Application filed May 29, 1924. Serial No. 716,838.

My invention relates to improvements in photographic cameras and lenses, particularly those used in photographing on films.

One of my aims is to obtain a better definition and greater depth of view without the diminishing of light, which generally results when the sharpness of definition is increased by stopping down the objective lens. To secure this improvement, I place a refracting body or lens at the focal plane, and thereby secure an increase of the distance from the objective to the point at which the light rays converge, and, simultaneously, I decrease the angle of convergence of the light rays of the light cone, as will be fully explained hereinafter. This focal plane lens is preferably in contact with the carrier of sensitized material (generally a film) on which the photograph is to be produced.

Another object of my invention is to keep the sensitive film firmly in the exact position it should occupy during exposure, so as to eliminate any incorrectness of focusing, due to warping, bagging, or sagging of the film.

Reference is to be had to the accompanying drawing, in which Fig. 1 is a diagram, illustrating the general principles of my improved optical system, in longitudinal section; Fig. 2 is a diagrammatic face view of the diaphragm shown in Fig. 1; Fig. 3 is partly a side elevation and partly a vertical section of a camera embodying my invention; and Figs. 4, 5 and 6 represent different types of focal plane lenses, according to my invention.

A designates a photographic objective of any standard or approved character, and B (Figs. 1 and 2) is the stop or diaphragm, for instance an adjustable one of the type known as an iris diaphragm. C indicates the normal focus at approximately $f^4$. The parallel rays of light entering the objective are made to converge in a cone having its base at the aperture B' of the diaphragm and its apex at the normal focus C. In an axial section of said cone, as in Fig. 1, D and D' designate the two extreme converging or marginal rays of light, the angle between these rays being the angle at the apex of the cone. At E I have shown in Fig. 1 the refracting body or lens placed according to my invention in such a manner that the normal focus C of the objective A lies within said body, or, in other words, the rays D, D' will enter said body before they reach the plane of said focus C, as indicated at F, F'. This body or lens may be a plate of glass of high refractive index, for instance, high crown glass. By refraction, the rays D, D' are deflected in such a manner as to reduce their angle of convergence, so that instead of meeting at the normal focal plane C of the objective A, they will meet at a point farther distant than the focus C from said objective, and this point or lengthened focus H will lie substantially in that face of the refracting body or lens E which is farthest away from the objective A, that is to say, in or near the rear face of said body or lens E. It will be readily seen that the angle formed by the marginal refracted rays H, F and H, F' is smaller than the angle formed by the corresponding rays D, D' before they enter the focal plane lens or refractor E. If we extend the lines HF and HF' forward through the diaphragm B, they will intersect the plane of said diaphragm at J and J', respectively, indicating an opening of the size K (Fig. 2) as the size of the stop to which it would be necessary to narrow down the light-passage of the objective A in order to obtain a focus at H without the use of my improved focal plane lens or refractor E. Obviously, much less light would reach the focus at H in this case than when the lens E is used, the difference in the amount of light being indicated approximately by the space between the circles K and B' in Fig. 2, the opening B', as referred to above, corresponding to the normal opening of the objective at $f^4$. If the lines HF J and HF' J' are extended forwardly beyond the objective A until their distance from each other equals the diameter of the opening B', as indicated at I, I', we may consider this as the opening of an imaginary diaphragm J'', set in an imaginary objective of greater focal length than the objective A, and having the same optical effect as my combination of the objective A (of shorter focus) and the focal plane lens E.

I prefer to employ a lens or refractor which is optically neutral or nearly so (that is, having but little collecting or divergent action), for instance, a plate or glass having parallel front and rear surfaces. The power of this focal plane lens depends on its refractive index. The higher this index, considered in relation to the axis, the smaller will be the extreme angle of the refracted marginal rays (that is, the angle F H,F'), or, as it may be expressed, the more sharply pointed will be the cone or pencil of refracted rays forming the image.

In Fig. 1, the focal plane lens or refractor E is shown thicker than it would generally be made, and, under the conditions illustrated, this lens might be a piece of solid high crown glass having a refractive index of 1.62. This unusual thickness has been adopted in Fig. 1 merely to illustrate more clearly the manner in which the original light pencil of a standard objective is refracted and brought to a sharper focus within the body of said glass or lens E.

In practice, it would not be feasible to have a focal plane lens of a parallel plate as thick as in Fig. 1, because of the great amount of dispersion and linear distortion, which would negative the result desired. Therefore, in order to obtain the best results in practice, it is necessary to have the high refractive element (which may not be very transparent) of comparatively greater thinness, so thin in fact that it can only be used successfully by being cemented against a thicker plate of good transparency and of lower refractive index (low crown glass), which can not only be made almost perfectly colorless but more achromatic and comparatively free from distortion. This plate, also of exaggerated thickness, is illustrated in Figs. 5 and 6, in which L' and L'' are the high crown glass and M' and M'' are the low crown glass.

Fig. 3, a general assembly of my new camera, is shown partly in section. N is the sensitive film in contact with the focal plane lens L M. O is part of the box holding the said lens. P is a flexible diaphragm with an air chamber Q for pressing the film N against the lens L M. R is a compressible bulb for compressing air in chamber Q. S is a spring for maintaining pressure on bulb R. This spring S may be moved to engage the bulb R so as to hold the film stationary, or out of engagement with the bulb, when the film is to be released for movement. It will be understood that the marginal portion of the diaphragm P engages the back O' of the camera. A is the usual objective mounted in the front, the objective in this instance being of the high speed type, which, with the aid of my invention, can be used generally with greater success.

Fig. 4 shows a plate M''' embodying the focal plane lens, as when a glass of lower refractive power (crown glass) is used, one side of said plate being straight and the other side convex.

Fig. 5 shows the compound or laminated plate or lens when a higher refractive power is desired, in which M' is a glass of low refractive power and L' one of high refractive power.

Fig. 6 shows a similar lens provided with internal curved surfaces.

Focal plane lenses of the type having a curved exposed surface may be of considerable thickness, but, inasmuch as they have powers not possessed by the more neutral plane surface, they enter into a closer optical relation with the front objective, so that the latter may have to be especially designed to accommodate them.

I claim as my invention:

1. In photographic apparatus, an image-forming objective and an auxiliary refracting element located in the region of the focal plane of said objective and compounded of sections of different refractive power, so as to combine great refractive power with low dispersion and good transparency.

2. In photographic apparatus, an image-forming objective and an auxiliary refracting element located in the region of the focal plane of said objective and compounded of a relatively thick front section of comparatively low refractive index, and a relatively thin rear section of comparatively high refractive index.

3. In photographic apparatus, an image-forming objective and an auxiliary refracting element located in the region of the focal plane of said objective, said refracting element being adapted to avoid linear distortion and compounded of sections of different refractive power, so as to combine high refractive power with low dispersion and good transparency.

4. In a photographic film camera, an image-forming objective, an auxiliary refracting element located in the region of the focal plane of said objective and having a rear surface conforming to the shape of the film when in focus, and flexible means including an air-chamber for pressing the film against said surface of the refracting element.

5. In a photographic film camera, an image-forming objective, an auxiliary refracting element located in the region of the focal plane of said objective and comprising a front section of high transparency but relatively low refractive index and a rear section of high refractive index, and means for holding the film against the rear surface of said rear section.

6. In a photographic film camera, an image-forming objective, an auxiliary refracting element located in the region of the focal plane of said objective and comprising a relatively thick and strong front section of comparatively low refractive index and a relatively thin rear section of comparatively high refractive index, and means for holding the film against the rear surface of said rear section.

7. In a photographic film camera, an image-forming objective, an auxiliary refracting element located in the region of the focal plane of said objective, and a flexible diaphragm including an air-chamber for holding the film against the rear surface of said refracting element.

8. In a photographic film camera, an image-forming objective, an auxiliary refracting element located in the region of the focal plane of said objective, a flexible diaphragm adapted to engage the film on the side opposite to said refracting element and containing an air-chamber for exerting pressure on said diaphragm.

9. In a photographic film camera, an image-forming objective, an auxiliary refracting element located in the region of the focal plane of said objective, a flexible diaphragm adapted to engage the film on the side opposite to that which engages the rear surface of said refracting element, said diaphragm containing an air chamber and having means for putting it under pressure to press the diaphragm forward and to hold the film stationary, or releasing the pressure so as to allow the film to be moved.

10. In a photographic film camera, an image-forming objective, an auxiliary refracting element located in the region of the focal plane of said objective, a flexible diaphragm adapted to engage the film on the side opposite to that which engages the rear surface of said refracting element and having an air-chamber and means for applying or removing pressure to or from said air-chamber.

11. In a photographic film camera, an image-forming objective, an auxiliary refracting element located in the region of the focal plane of said objective, a flexible diaphragm adapted to engage the film on the side opposite to that which engages the rear surface of said refracting element and having an air-chamber, and spring pressure means movable into and out of engagement with said diaphragm.

12. In photographic apparatus, an image-forming objective and an auxiliary refracting element positioned at the focal plane of said objective, said element having its front surface convex and its back surface conforming to the surface of the sensitive film.

In testimony whereof, I affix my signature.

ALBERT F. SHORE.